(12) United States Patent
Yamashiro

(10) Patent No.: US 8,885,469 B2
(45) Date of Patent: Nov. 11, 2014

(54) DRIVE ASSIST APPARATUS AND DRIVE ASSIST SYSTEM

(75) Inventor: Takahisa Yamashiro, Chiryu (JP)

(73) Assignee: Denso Corporation, Kariya (JP)

( * ) Notice: Subject to any disclaimer, the term of this patent is extended or adjusted under 35 U.S.C. 154(b) by 102 days.

(21) Appl. No.: 13/494,118

(22) Filed: Jun. 12, 2012

(65) Prior Publication Data

US 2012/0323406 A1 Dec. 20, 2012

(30) Foreign Application Priority Data

Jun. 17, 2011 (JP) ................................. 2011-135469

(51) Int. Cl.
*G08G 1/16* (2006.01)
*G08G 1/00* (2006.01)
*H04L 29/08* (2006.01)

(52) U.S. Cl.
CPC .................. *G08G 1/22* (2013.01); *G08G 1/161* (2013.01); *H04L 67/12* (2013.01)
USPC .............................. 370/230; 701/36; 701/300

(58) Field of Classification Search
None
See application file for complete search history.

(56) References Cited

U.S. PATENT DOCUMENTS

| | | | | |
|---|---|---|---|---|
| 6,791,471 B2 * | 9/2004 | Wehner et al. | ................. | 340/903 |
| 7,102,496 B1 * | 9/2006 | Ernst et al. | ..................... | 340/436 |
| 7,689,230 B2 * | 3/2010 | Spadafora et al. | ......... | 455/456.1 |
| 2005/0088318 A1 * | 4/2005 | Liu et al. | ....................... | 340/902 |
| 2008/0247310 A1 * | 10/2008 | Ruffini et al. | ................. | 370/230 |
| 2010/0223332 A1 * | 9/2010 | Maxemchuk et al. | ........ | 709/204 |

FOREIGN PATENT DOCUMENTS

| | | |
|---|---|---|
| JP | 2000-348300 | 12/2000 |
| JP | 2006-048285 | 2/2006 |
| JP | 2008-278045 | 11/2008 |
| JP | 2009-003822 | 1/2009 |
| JP | 2010-020484 | 1/2010 |

OTHER PUBLICATIONS

Boukerche et al., "Improving Neighbor Localization in Vehicular Ad Hoc Networks to Avoid Overhead from Periodic Messages", IEEE Global Telecommunications Conference (GLOBECOM) 2009, Nov. 30-Dec. 4, 2009, pp. 1-6.*

* cited by examiner

*Primary Examiner* — John R. Olszewski
*Assistant Examiner* — Todd Melton
(74) *Attorney, Agent, or Firm* — Harness, Dickey & Pierce, PLC

(57) ABSTRACT

When prediction information is newly acquired, a degree of the difference between a predicted via-point at a current time point is determined based on already transmitted past prediction information and a current position contained in the newly acquired prediction information. Then, it is determined whether the determined degree of the difference is a predetermined value or more. When the degree of the difference is determined to be the predetermined value or more, the newly acquired prediction information is transmitted.

11 Claims, 5 Drawing Sheets

DRIVE ASSIST APPARATUS AND DRIVE ASSIST SYSTEM

CROSS REFERENCE TO RELATED APPLICATION

This application is based on Japanese Patent Application No. 2011-135469 filed on Jun. 17, 2011, the disclosure of which is incorporated herein by reference.

TECHNICAL FIELD

The present disclosure relates to a drive assist apparatus and a drive assist system containing this drive assist apparatus.

BACKGROUND

[Patent Document 1] JP 2000-348300 A

A technology of convoy is known in which a trailing vehicle trails a leading vehicle at a predetermined inter-vehicle distance by use of information transmitted from the leading vehicle via inter-vehicle communications. For example, Patent Document 1 discloses a technology that, since each vehicle other than the last vehicle may be a leading vehicle during convoy, each vehicle periodically transmits trailing information about its own position, operational amounts (steering, acceleration, and brake), and momentums (speed, acceleration, and yaw rate) to its trailing vehicle, and each trailing vehicle trails its leading vehicle on the basis of the received trailing information.

However, congestion is likely to occur in the technology of Patent Document 1. In the technology of Patent Document 1, since trailing information is periodically transmitted from each vehicle through inter-vehicle communications, trailing information is likely to occupy a communication band when many vehicles are present in the convoy, and thus congestion in communications is likely to occur.

SUMMARY

It is an object of the present disclosure is to provide a drive assist apparatus and a drive assist system in which congestion in communications can be avoided by suppressing a frequency of transmission of trailing information to a required frequency when the trailing information is transmitted through inter-vehicle communications.

To achieve the above object, according to a first example of the present disclosure, a drive assist apparatus in a vehicle is provided as follows. The drive assist apparatus has a prediction information acquisition section that successively acquires prediction information at a time point from an in-vehicle information detection portion, wherein the prediction information is enabled to be transmitted via inter-vehicle communications. The drive assist apparatus includes a via-point prediction section, a difference determination section, and a transmission determination section. The via-point prediction section is to obtain a predicted via-point of the vehicle where the vehicle exists from a time point to a future time point on a basis of prediction information at the time point acquired by the prediction information acquisition section, wherein the prediction information at the time point contains at least a position at which the vehicle exists at the time point. The difference determination section is configured such that, when the prediction information acquisition section newly acquires second prediction information at a second time point that is later than a first time point, a difference is obtained between (i) a predicted via-point of the vehicle predicted at the second time point between the first time point to the future time point on a basis of first prediction information at the first time point, the first prediction information at the first time point being acquired at the first time point by the prediction information acquisition section and being already transmitted via the inter-vehicle communications and (ii) a position, at which the vehicle exists at the second time point, obtained on a basis of the second prediction information at the second time point. The difference determination section is further determining whether the obtained difference is a predetermined value or more. The transmission determination section is to determine that the second prediction information newly acquired is transmitted when the difference determination section determines that the difference is the predetermined value or more, and to determine that the second prediction information newly acquired is not transmitted when the difference determination section determines that the difference is not the predetermined value or more.

Further, according to a second example of the present disclosure, a drive assist system is provided as including a plurality of the drive assist apparatuses of the above first example.

Yet further, according to a third example of the present disclosure, a program product stored in a non-transitory computer readable storage medium is provided for the drive assist apparatuses of the above first example. That is, the product includes instructions of: acquiring first prediction information at a first time point from the information detection portion; transmitting the first prediction information at the first time point via the inter-vehicle communications; acquiring second prediction information at a second time point from the information detection portion, the second time point being later than the first time point; obtaining an actual second-time-point position, at which the vehicle actually exists at the second time point, based on the second prediction information at the second time point; obtaining a predicted second-time-point via-point, at which the vehicle is predicted to exit at the second time point, based on the first prediction information at the first time; obtaining a difference between (i) the actual second-time-point position of the vehicle, and (ii) the predicted second-time-point via-point of the vehicle; determining whether the difference is a predetermined value or more; and determining that the second prediction information at the second time point is transmitted when the difference is determined to be the predetermined value or more, whereas determining that the second prediction information at the second time point is not transmitted when the difference is determined not to be the predetermined value or more.

In the above configurations of the examples, when prediction information is newly acquired by a prediction information acquisition section of a host vehicle, a difference is obtained between (i) a predicted via-point at a current time point of the host vehicle on the basis of already transmitted past first prediction information and (ii) an actual current position of the host vehicle contained in the newly acquired second prediction information. It is thereby determined whether the obtained difference is a predetermined value or more.

When the difference between (i) the predicted via-point at the current time point and (ii) the actual current position is small, a different vehicle that received the past first prediction information transmitted from the host vehicle can predict the current position at the current time point of the host vehicle based on the received past first prediction information accurately. On the other hand, when the difference between the predicted via-point and the actual current position is large, it is difficult for the different vehicle to predict the current position of the host vehicle accurately.

Thus, in the above configurations, when the difference is determined to be a predetermined value or more in a difference determination section, it is determined that second prediction information newly acquired by a prediction information acquisition section is transmitted. On the other hand, it is determined that the newly acquired second prediction information is not transmitted when the difference is not the predetermined value or more.

That is, when it is difficult to predict a current position of the host vehicle accurately from the transmitted past first prediction information, the newly acquired second prediction information is transmitted. On the other hand, when a current position of the host vehicle can be predicted accurately from the transmitted past first prediction information, the newly acquired second prediction information is not transmitted. Herein, the prediction information allows acquisition of a via-point where a leading vehicle reaches in the future and used for a following or trailing the leading vehicle. The prediction information can be thus used as trailing information.

Thus, under the configurations of the examples of the present disclosure, when trailing information is transmitted by inter-vehicle communications, a frequency of transmission of the trailing information is reduced to a required frequency to allow avoidance of congestion.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

Figure 1:
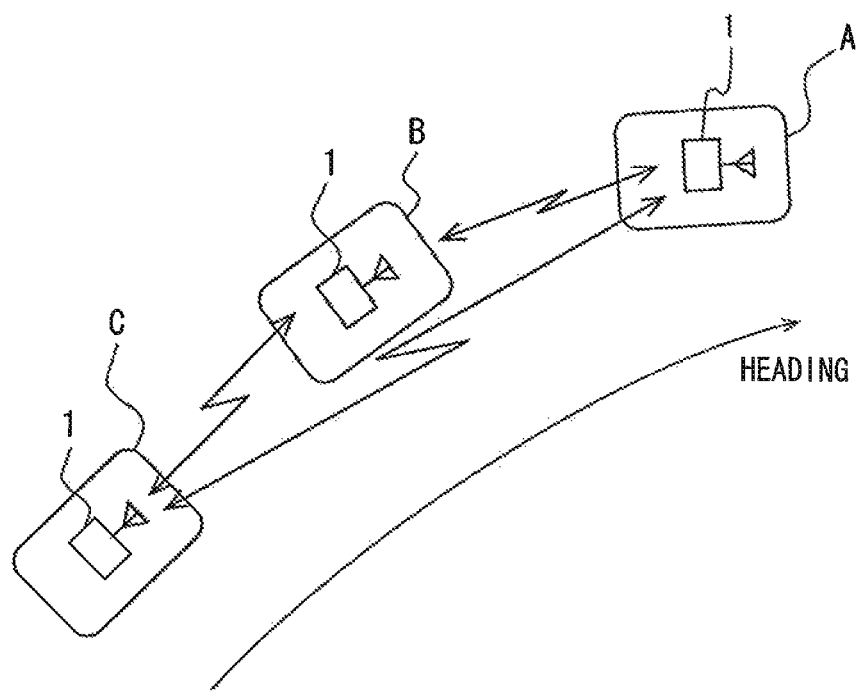
FIG. 1 is a block diagram showing a schematic structure of a drive assist system.

Hereafter, embodiments of the present disclosure are described in reference to the drawings. FIG. 1 is a block diagram showing a schematic structure of a drive assist system 100 of the present disclosure. The drive assist system 100 shown in FIG. 1 contains three drive assist apparatuses 1 respectively mounted to multiple vehicles (a vehicle A, a vehicle B, and a vehicle C).

The drive assist apparatus 1 is mounted to vehicles such as automobiles, and to the vehicles A to C as automobiles in this embodiment. FIG. 1 shows a structure in which the drive assist system 100 contains three drive assist apparatuses 1 but does not necessarily contain three drive assist apparatuses 1. As long as multiple drive assist apparatuses 1 respectively mounted to vehicles are contained in the drive assist system 100, the drive assist system 100 may contain three or other number of the drive assist apparatuses 1. Hereinafter, for convenience, the drive assist system 100 is described as containing three drive assist apparatuses 1 respectively mounted to the vehicles A to C.

Figure 2:
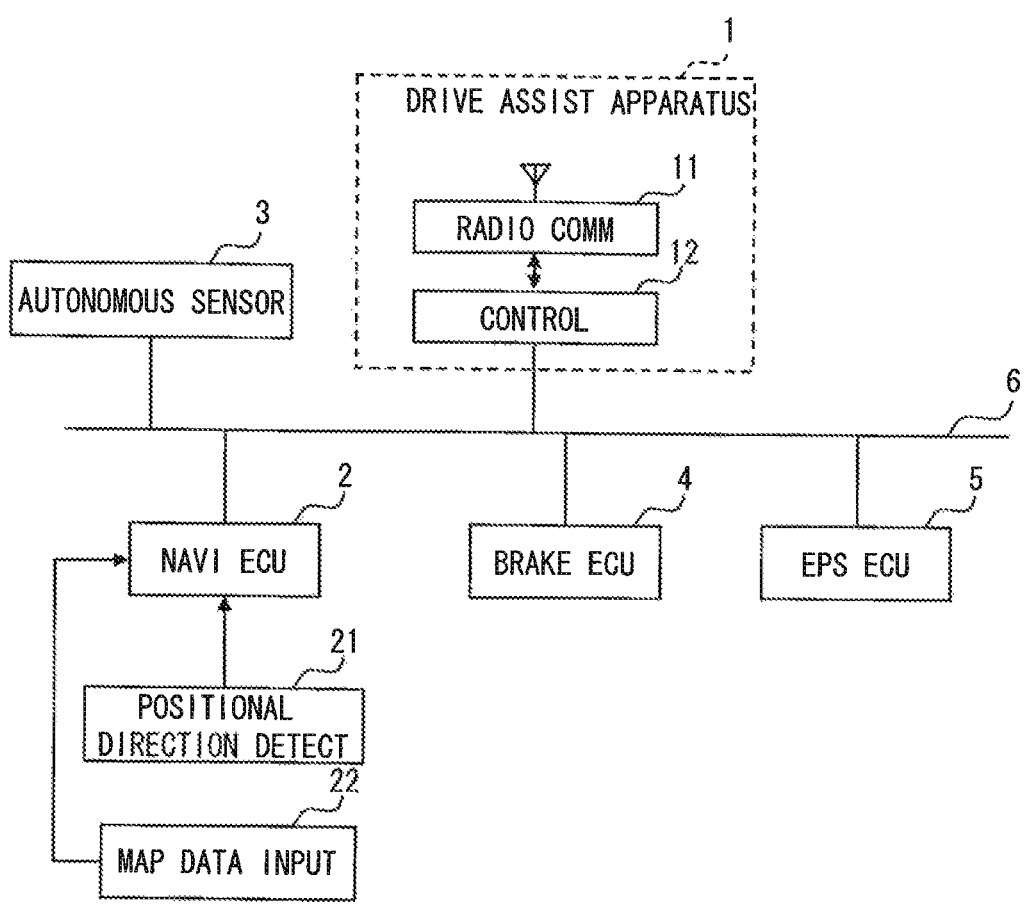
FIG. 2 is a block diagram showing a schematic structure of a drive assist apparatus.

Here, a schematic structure of the drive assist apparatus 1 is described in reference to FIG. 2. FIG. 2 shows the block diagram of the schematic structure of the drive assist apparatus 1. As shown in FIG. 2, the drive assist apparatus 1 is provided with a radio communications portion 11 and a control circuit 12. The drive assist apparatus 1 is connected to and can exchange electronic information with a navigation ECU 2, an autonomous sensor 3, a brake ECU 4, and an electric power steering (EPS) ECU 5. The drive assist apparatus 1, navigation ECU 2, autonomous sensor 3, brake ECU 4, and EPS ECU 5 are connected to each other by an in-vehicle LAN 6 following communications protocols such as the controller area network (CAN).

The navigation ECU 2 is a control unit for an in-vehicle navigation apparatus, and is structured mainly by a well-known microcomputer having a CPU, a ROM, a RAM, a backup RAM, etc. The navigation ECU 2 executes various processes as navigation functions on the basis of a current position and traveling direction of a vehicle detected by a positional direction detector 21 mentioned later and map data read from a map data input portion 22 mentioned later.

The positional direction detector 21 detects a current position and traveling direction of a vehicle successively on the basis of information acquired from a geomagnetic sensor that detects geomagnetism, a gyroscope that detects an angular velocity about a vertical direction of a host vehicle, a distance sensor that detects a traveled distance of the host vehicle, and a GPS receiver for the global positioning system (GPS) that detects a current position of the host vehicle on the basis of radio waves from satellites. Since these sensors have errors having different properties, multiple sensors complement each other. The positional direction detector 21 may include part of the above sensors or ones other than the above sensors in accordance with an accuracy of each sensor. It is noted that a host vehicle may be defined as a vehicle to which a relevant apparatus or the like is mounted.

A current position may be expressed by a coordinate (latitude, longitude). A traveling direction may be expressed as an azimuth relative to the north or as a link direction mentioned later. In this embodiment, a current position is expressed by a coordinate, and a traveling direction is expressed as an azimuth relative to the north.

The map data input portion 22 is equipped with a storage (not shown) to input map data stored in the storage. The map data contains link data and node data that show roads. The link data includes a unique number (link ID) to identify a link, a link length that shows a length of a link, a link direction, a link azimuth, node coordinates (latitude, longitude) of a start and end of a link, a road name, a type of road, a one-way attribute, a road width, the number of lanes, the presence and number of right-turn specific lanes and of left-turn specific lanes, and various data such as a speed limit value. In contrast, the node data includes a node ID to uniquely number each node where each road on a map intersects, joins, and branches, a node coordinate, a node name, a connection link ID describing a link ID of a link connected to a node, and various data such as types of intersections.

In addition to the map data stored in the storage of the map data input portion 22, map data stored in a server may be used via a server communications portion not shown.

The autonomous sensor 3 detects the existence of a different vehicle in front of a vehicle mounting the drive assist apparatus 1 and a distance to the different vehicle. In this embodiment, the sensor that detects a leading vehicle and a distance to the leading vehicle is shown. A sensor that detects a trailing vehicle and a distance to the trailing vehicle also may be provided. A laser radar, a millimeter wave radar, a camera, etc. can be used as the autonomous sensor 3.

The brake ECU 4 includes, as a main component, a microcomputer having a CPU, a ROM, a RAM, a backup RAM, etc. On the basis of vehicle information such as a vehicle speed detected from signals of the speed sensor, longitudinal acceleration and lateral acceleration detected from signals of the acceleration sensor, and a brake fluid pressure detected from signals of the brake pressure sensor, the brake ECU 4 executes various control programs stored in the ROM to execute various processes of brake of a host vehicle.

On the basis of vehicle information such as a vehicle speed detected from signals of the vehicle speed sensor, a steering torque detected from signals of the toque sensor, a steering angle detected from signals from a steering angle sensor, lateral acceleration detected from signals of the acceleration sensor, the EPS ECU 5 executes processes of steering assist and of control of a steering angle.

The radio communications portion 11 of the drive assist apparatus 1 has a transmission and reception antenna and delivers information about a host vehicle and receives information about a different vehicle via radio communications instead of a telephone network, for example, between the host vehicle and different vehicles in the range of a few hundred meters around the host vehicle (that is, the inter-vehicle communications). For example, the radio communications portion 11 executes inter-vehicle communications by one-way broadcast communications using radio waves in 700 MHz band. This embodiment shows the structure in which the radio communications portion 11 executes inter-vehicle communications by radio communications using radio waves in 700 MHz band, but is not necessarily limited to this structure. For example, this embodiment may execute radio communications using radio waves in 5.9 GHz band to execute inter-vehicle communications.

The control circuit 12 of the drive assist apparatus 1 is constituted as a normal computer, and includes a well-known CPU, memories such as a ROM, RAM, and EEPROM, an I/O, and a bus line that connects such components (these included components are not shown). The control circuit 12 executes various processes on the basis of various information inputted from the radio communications portion 11, navigation ECU 2, autonomous sensor 3, brake ECU 4, and EPS ECU 5.

For example, the control circuit 12 successively acquires prediction information to determine a predicted via-point where a host vehicle reaches in the future. The prediction information includes a current position of a host vehicle, a travel direction of the host vehicle, a turning radius of the host vehicle, a vehicle speed of the host vehicle, and acceleration and deceleration of the host vehicle, etc. For example, the information about a current position and travel direction of the host vehicle are acquired from the navigation ECU 2 that inputs therein current positions and travel directions successively detected by the positional direction detector 21. Therefore, the control circuit 12 may function as an information acquisition section, device, or means. The control circuit 12 may acquire the information about a current position and travel direction of the host vehicle from the positional direction detector 21 without the navigation ECU 2.

For example, a turning radius of the host vehicle is acquired by acquiring information about a steering angle from the EPS ECU 5 that inputs therein information about steering angles successively detected by the steering sensor and calculating the turning radius on the basis of the turning angle. As one example, the correspondence between steering angles and turning radiuses acquired by actual measurements and data interpolation is stored in the memory such as the ROM of the control circuit 12, and on the basis of this correspondence, a turning radius may be calculated.

Further, for example, a speed, acceleration, and deceleration of the host vehicle are acquired from the brake ECU 4 and EPS ECU 5 that receive information about vehicle speeds successively detected by the vehicle speed sensor and information about acceleration and deceleration successively detected by the acceleration sensor. Therefore, the ECU 2, brake ECU 4, EPS ECU 5, vehicle speed sensor, acceleration sensor, the steering angle sensor, etc. may function as an information detection portion. The prediction information may use part of the above-mentioned information or information other than the above-mentioned information.

The control circuit 12 acquires these prediction informations at each predetermined time (i.e., time point) and determines whether to transmit the information from the radio communications portion 11. When the control circuit 12 determines the transmission, the control circuit 12 transmits these prediction informations from the radio communications portion 11. The determination of whether to transmit the prediction information from the radio communications portion 11 is explained in detail below.

It is noted that, in the present application, "information" may be used as being countable as well as uncountable and be identical to "an information item." Thus, "several informations" may be used and be identical to "several information items."

When transmitting prediction information, the control circuit 12 may add a GPS time when the prediction information is acquired. Hereinafter, in this embodiment, a current position and travel direction of the host vehicle described below are transmitted together with a GPS time when the current position and travel direction are detected.

The control circuit 12 receives prediction information transmitted from the drive assist apparatuses 1 mounted to different vehicles. On the basis of current positions and travel directions of the different vehicles contained in the received prediction information and a current position and travel direction of the host vehicle, tracks or paths of the host vehicle and the different vehicles are acquired to permit identification of each different vehicle (that is, identification of each drive assist apparatus 1), and a relative position of each different vehicle to the host vehicle is acquired. It is noted that the track of the vehicle may be referred to as the path of the vehicle and a predicted track may be referred to as a predicted or future path. Further, the control circuit 12 identifies a leading vehicle (that is, a different vehicle traveling on the same lane as the host vehicle and immediately in front of the host vehicle) of the host vehicle on the basis of the relative positions and map data. The leading vehicles herein contain the nearest leading vehicle (a different vehicle traveling on the same lane as the host vehicle and immediately in front of the host vehicle) and leading vehicles traveling in front of the nearest leading vehicle. In an example of this embodiment in FIG. 1, the vehicle A is identified as a leading vehicle in the drive assist apparatus 1 of the vehicle B, and the vehicle A and vehicle B are identified as leading vehicles in the drive assist apparatus 1 of the vehicle C.

Here, matching of a current position and travel direction of the host vehicle and those of the different vehicles at the same time point is executed using a GPS time of detection of the current positions and travel directions. The GPS times at the detection of current positions and travel directions of the different vehicles are added to and transmitted together with the prediction information. Current positions and travel directions detected by the host vehicle are successively stored in the memory such as the RAM of the control circuit 12 correspondingly to GPS times at the detections of the current positions and travel directions.

The control circuit 12 identifies the drive assist apparatuses 1 of different vehicles that can communicate with the drive assist apparatus 1 (hereinafter, the host apparatus) of the host vehicle, and stores information about the identified drive assist apparatuses 1. In detail, the drive assist apparatus 1 whose prediction information can be received by the host apparatus is the drive assist apparatuses 1 of different vehicles that can communicate with the host apparatus. Therefore, the control circuit 12 may function as a communication target identification section, device, or means. Each drive assist apparatus 1 is identified on the basis of tracks as mentioned above, and a temporary ID may be allocated to the identified drive assist apparatus 1. When an identifier (for example, a vehicle ID) unique to a vehicle mounting the drive assist apparatus 1 is transmitted from each drive assist apparatus 1, each drive assist apparatus 1 may be identified on the basis of the vehicle ID.

The control circuit 12 may store, e.g., a list of IDs of the drive assist apparatuses 1 identified as mentioned above. An ID of the identified drive assist apparatus 1 is deleted after a predetermined time has elapsed since the identification, and an ID of the newly identified drive assist apparatus 1 is added to the list. Hereinafter, in this embodiment, a list (hereinafter, communication target list) of IDs of the drive assist apparatuses 1 identified as mentioned above is described as stored in the memory.

In addition, when the control circuit 12 receives prediction information transmitted from the nearest leading vehicle, the control circuit 12 predicts a travel position of the nearest leading vehicle to cause the host vehicle to trail the nearest leading vehicle while keeping an inter-vehicle distance to the nearest leading vehicle at a preset value. The trailing may be made in the same way as the well-known method. For example, in the trailing, the host vehicle may be accelerated or decelerated in response to instructions of the brake ECU 4 or an engine ECU not shown, and steered wheels of the host vehicle may be steered by instructing an ECU (not shown) that controls the drive of an actuator to steer the steered wheels of the host vehicle. As a result, when multiple vehicles mounting the drive assist apparatuses 1 are longitudinally arranged, each vehicle can trail a vehicle immediately in front thereof to form a vehicle group or convoy.

The nearest leading vehicle may be identified on the basis of the tracks as described above. The inter-vehicle distance may be set in response to a vehicle speed or at a fixed value, for example. The inter-vehicle distance may be controlled using the detection results of the autonomous sensor 3.

Figure 3:
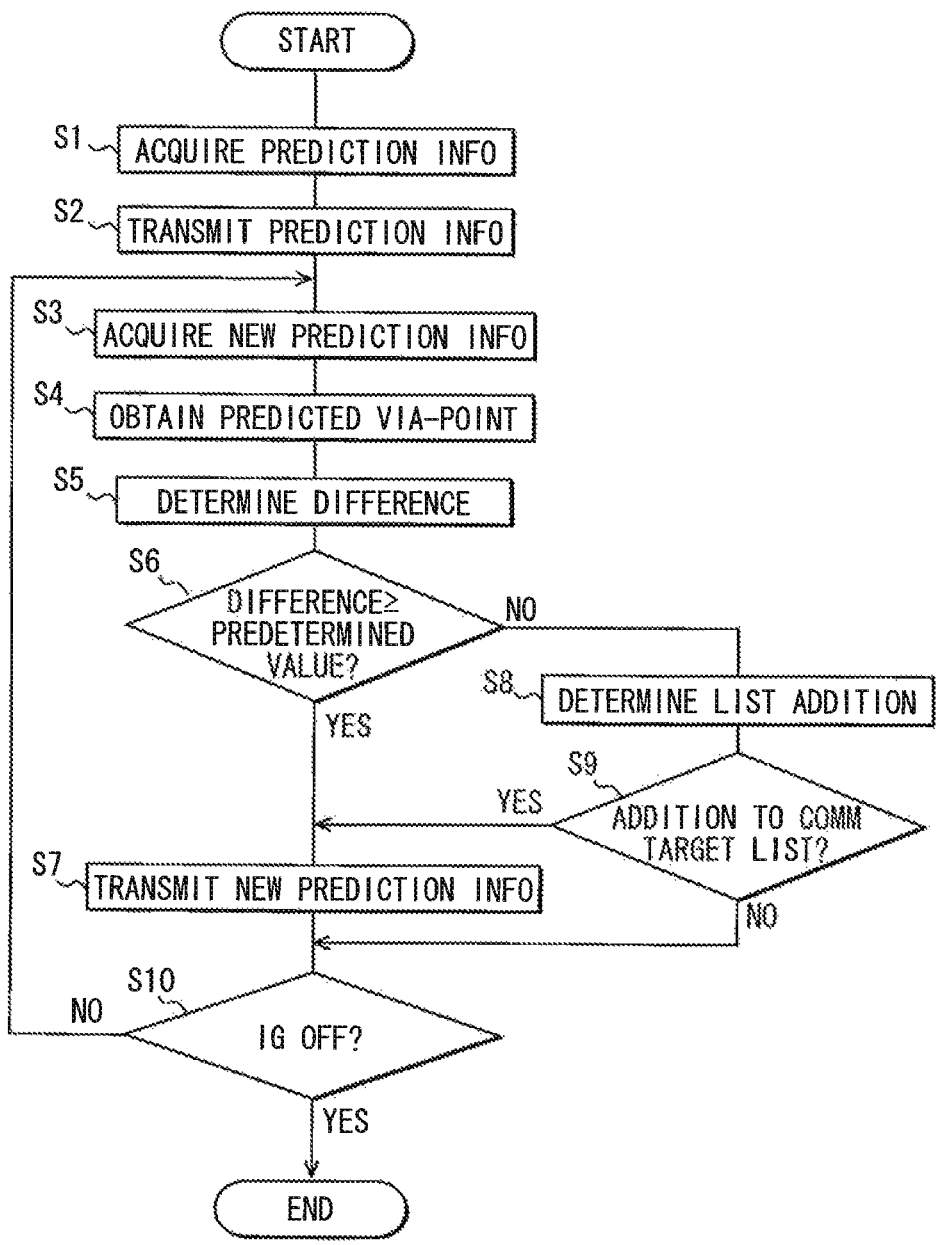
FIG. 3 is a flowchart diagram showing a flow of a transmission related process by a control circuit of the drive assist apparatus.

Here, the explanation about the transmission of prediction information by the control circuit 12 (hereinafter, transmission related process) is made in reference to FIG. 3. FIG. 3 is a flowchart showing a flow of a transmission related process by the control circuit 12 of the drive assist apparatus 1. This flow is started when an ignition of the host vehicle is turned on and the host vehicle starts traveling.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

First, at S1, prediction information is acquired at a first time point and the flow proceeds to S2. At S2, the prediction information at the first time point acquired at S1 is transmitted from the radio communications portion 11, and the flow proceeds to S3. At S3, new prediction information is acquired at a second time point when a predetermined time has elapsed after the latest past acquisition of the prediction information, and the flow proceeds to S4. Herein, the second time may serve as a current time point and is later than the first time point that serves a past time point.

At S4, on the basis of the already transmitted past prediction information, a predicted via-point of the host vehicle at the current time point is acquired and the flow proceeds to S5. For example, the transmitted past prediction information is preferably but not limited to the latest past prediction information. Past prediction information transmitted two or three times before may be used, for example. Therefore, the control circuit 12 may function as a via-point prediction section, device, or means. In this embodiment, the latest transmitted past prediction information is used in the following explanation.

At S4, a predicted via-point of the host vehicle at the current time point may be acquired on the basis of the latest transmitted past prediction information and an elapsed time from acquisition of the prediction information to the current time point. The elapsed time may be measured by a timer circuit not shown etc.

At S5, difference determination is made and the flow proceeds to S6. In the difference determination, a degree of the difference between a current position of the host vehicle contained in the prediction information newly acquired at S3 and the predicted via-point acquired at S4 is acquired. For example, in this embodiment, as a degree of the difference, a distance between a coordinate of the current position of the host vehicle contained in the prediction information newly acquired at S3 and a coordinate of the predicted via-point acquired at S4 is calculated. Therefore, the control circuit 12 may function as a difference determination section, device, or means.

It is determined whether the calculated distance (that is, a degree of the difference) is a predetermined value or more. The predetermined value herein can be set arbitrarily to any value larger than a distance between the current position and predicted via-point that is generated due to an error of a current position in the positional direction detector 21.

At S6, when it is determined that a degree of the difference is the predetermined value or more in the difference determination (YES at S6), it is determined that newly acquired prediction information is transmitted, and the flow proceeds to S7. When it is determined that a degree of the difference is not the predetermined value or more in the difference determination (NO at S6), it is determined that newly acquired prediction information is not transmitted, and the flow proceeds to S8. Therefore, the control circuit 12 may function as a transmission determination section, device, or means.

At S7, the prediction information newly acquired at S3 is transmitted from the radio communications portion 11, and the flow proceeds to S10. At S8, list addition determination is made and the flow proceeds to S9. In the list addition determination, after the prediction information is transmitted at 52 (that is, after the latest transmission of the prediction information), it is determined whether an ID of the new drive assist apparatus 1 is added to a communication target list.

When it is determined that the ID of the new drive assist apparatus 1 has been added to the communication target list at S9 (YES at S9), newly acquired prediction information is transmitted even when it is determined that the prediction information is not transmitted at S6, and the flow proceeds to S7. When it is determined that the new ID of the drive assist apparatus 1 has not been added to the communication target list (NO at S9), the flow proceeds to S10.

At S10, when an ignition of the host vehicle is turned off (YES at S10), the flow is ended. When the ignition of the host vehicle is not turned off (NO at S10), the flow returns to S3 and then is repeated.

When a degree of the difference between the predicted via-point at the current time point and the current position of the host vehicle contained in the newly acquired prediction information is small, a different vehicle that received the latest transmitted past prediction information can predict a current position of the host vehicle accurately on the basis of the received prediction information. On the other hand, when a degree of the difference between the predicted via-point and the current position is large, it is difficult for the different vehicle that has received the latest transmitted past prediction information to predict the current position of the host vehicle on the basis of the received prediction information.

Therefore, in this embodiment, when it is difficult to predict a current position of the host vehicle accurately on the basis of the latest transmitted past prediction information, newly acquired prediction information is transmitted; on the other hand, when it is possible to predict a current position of the host vehicle accurately on the basis of the latest transmitted past prediction information, newly acquired prediction information is not transmitted. The prediction information can be used as trailing information for trailing vehicles, as mentioned above. Accordingly, in this embodiment, when trailing information is transmitted via inter-vehicle communications, a frequency of transmission of the trailing information is reduced as required to avoid the congestion.

In this embodiment, when a new different vehicle mounting the drive assist apparatus 1 is added in the range of the inter-vehicle communications of the host vehicle, newly acquired prediction information can be transmitted to this new different vehicle. That is, the drive assist apparatus 1 of the newly added different vehicle in the range of the inter-vehicle communications of the host vehicle has not yet received the prediction information transmitted from the host apparatus. In the above structure, when the new different vehicle is added in the range of the inter-vehicle communications of the host vehicle, the drive assist apparatus 1 of the new different vehicle can receive the prediction information transmitted from the host apparatus immediately.

The embodiment of the present disclosure has been described as mentioned above. The present disclosure is not limited to the above-mentioned embodiment. The following embodiment (hereinafter, Modification 1) is also contained in the technical scope of the present disclosure. Hereinafter, Modification 1 is explained in reference to the drawings. For convenience, components having the same functions as those shown in the drawings used in the explanation of the above embodiment are indicated by the same reference numerals, and their explanation is not repeated.

In Modification 1, on the basis of a current position of a leading vehicle, a range (hereinafter, effective range) to acquire a predicted via-point of the host vehicle from prediction information acquired by the host apparatus is determined. When the prediction information is transmitted, the effective range of the prediction information also is transmitted.

Figure 4:
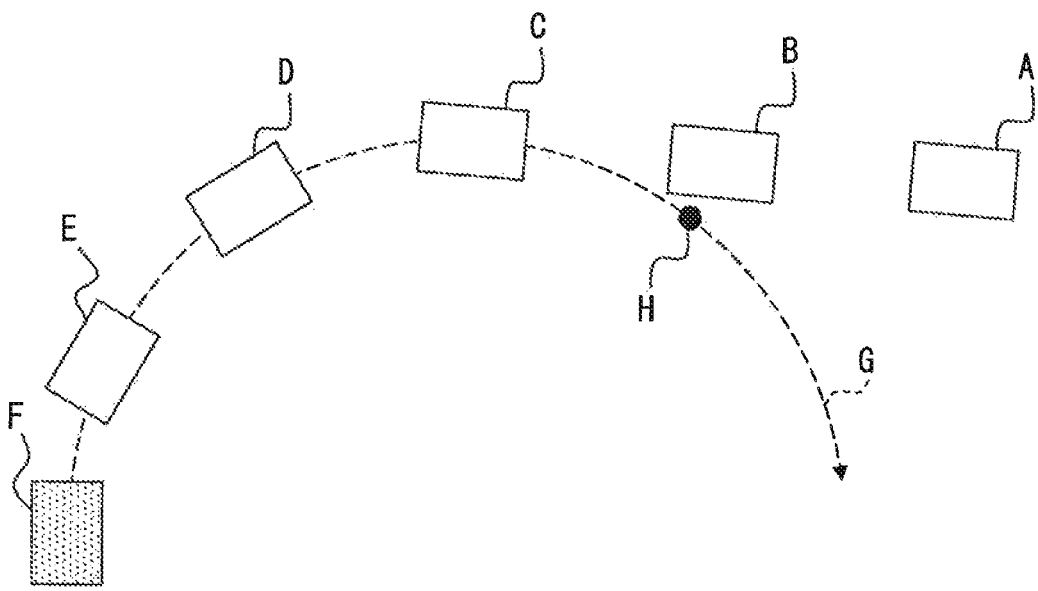
FIG. 4 is a schematic diagram to explain a deviation point in Modification 1.

In Modification 1, the control circuit 12 receives prediction informations transmitted from the drive assist apparatuses 1 of multiple different vehicles, and stores current positions contained in the prediction informations so as to be associated with the different vehicles (drive assist apparatuses 1) that are identified. In this embodiment, as shown in FIG. 4, as one example, explanation is made below by dealing with a case where a vehicle A, a vehicle B, a vehicle C, a vehicle D, a vehicle E, and a vehicle F that respectively mount the drive assist apparatuses 1 are arranged in this order, and each vehicle other than the vehicle A trails the vehicle immediately in front thereof to form a vehicle group or convoy.

Figure 5:
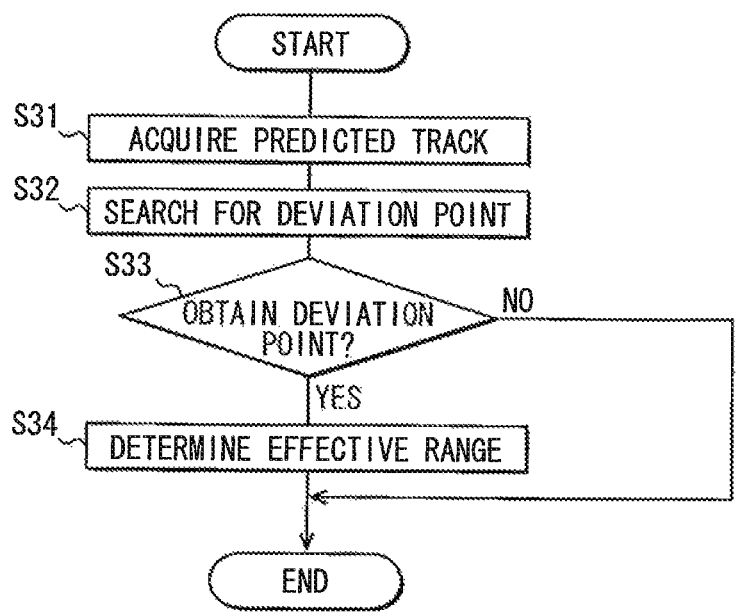
FIG. 5 is a flowchart diagram showing a flow of an effective range determination related process by the control circuit of the drive assist apparatus in Modification 1.

Here, in Modification 1, processes (hereinafter, effective range determination related process) related to determination of an effective range in the control circuit 12 are explained in reference to FIG. 5. FIG. 5 is a flowchart showing a flow of the effective range determination related process in the control circuit 12 of the drive assist apparatus 1 in Modification 1. This flow is started when prediction information of the host vehicle is acquired, for example. This flow is explained on the premise that prediction information has been received from the drive assist apparatus 1 of a leading (different) vehicle.

First, at S31, on the basis of acquired prediction information about the host vehicle, a predicted path of the host vehicle is acquired. Therefore, the control circuit 12 may function as a path prediction section, device, or means. In detail, a predicted path of the host vehicle can be acquired by acquiring predicted via-points at multiple points on the basis of the prediction information and connecting the via-points. Interpolation may also be used.

At S32, a deviation point search is executed, and the flow proceeds to S33. In the deviation point search, the predicted path acquired at S31 and a current position of a leading vehicle contained in the prediction information received from the leading vehicle are compared to search for a point (deviation point) where the leading vehicle initially deviates (i.e., starts to deviate) from a path of the host vehicle. Therefore, the control circuit 12 may function as a deviation point search section, device, or means. In this embodiment, a vehicle F shown by F of FIG. 4 is the host vehicle and the vehicles A to E shown by A to E of FIG. 4 are leading (different) vehicles.

The deviation point may be a positional coordinate (H of FIG. 4) on the latest predicted path where a leading vehicle (in this example, the vehicle B) initially deviates (i.e., starts to deviate) from the predicted path (G of FIG. 4). In addition, a position where a path of connected positions of the leading vehicles initially deviates (i.e., starts to deviate) from a predicted path may be the deviation point.

At S33, when a deviation point is retrieved in the deviation point search (YES at S33), the flow proceeds to S34. The flow is ended when the deviation point is not retrieved by the search in the deviation point search (NO at S33).

At S34, an effective range of the prediction information acquired based on the retrieved deviation point is determined, and the flow is ended. Therefore, the control circuit 12 may function as an effective range determination section, device, or means. For example, a coordinate of a deviation point may be determined as the effective range. In addition, a travel time from a point where prediction information is acquired to a deviation point is predicted from a speed and acceleration of the host vehicle, and the predicted time may be determined as the effective range. In this embodiment, the example in which a coordinate of a deviation point is determined as the effective range is explained below. The effective range determined at S34 is added to the acquired prediction information and transmitted when the acquired prediction information is transmitted from the host apparatus.

When the host vehicle trails a leading vehicle nearest to the host vehicle on the basis of the prediction information transmitted from the drive assist apparatus 1 of the leading vehicle, each vehicle can trail a vehicle immediately in front thereof to form a vehicle group. In this vehicle group, since each vehicle trails a vehicle immediately in front thereof, a current position of a leading vehicle is likely to be a future via-point of the host vehicle. Therefore, a point where a leading vehicle initially deviates from a predicted path of the host vehicle is a point where an accuracy of a predicted via-point acquired on the basis of prediction information acquired by the host apparatus is likely to decrease greatly.

In the above structure, the effective range is determined on the basis of a point where a leading vehicle initially deviates from a path of the host vehicle. Accordingly, it is possible to acquire the effective range to a point where an accuracy of a predicted via-point acquired based on the prediction information is likely to decrease greatly. The host apparatus transmits prediction information together with the effective range of the prediction information. In the trailing vehicles, the effective range to the point where an accuracy of a predicted via-point acquired based on the prediction information can be taken into consideration.

Figure 6:
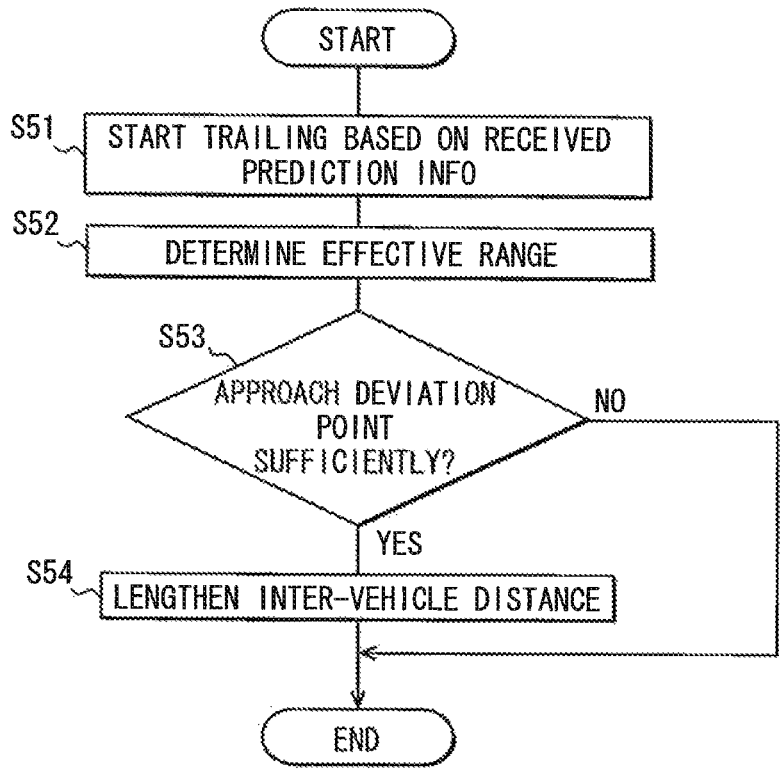
FIG. 6 is a flowchart diagram showing a flow of an effective range consideration process by the control circuit of the drive assist apparatus in Modification 1.

Then, in Modification 1, a process (hereinafter, effective range consideration process) in consideration of the effective range in the control circuit 12 when the prediction information having the effective range is received from the drive assist apparatus 1 of the nearest leading vehicle is explained in reference to FIG. 6. FIG. 6 is a flowchart showing a flow of the effective range consideration by the control circuit 12 of the drive assist apparatus 1 in Modification 1. This flow is started when the prediction information having the effective range is received from the drive assist apparatus 1 of the nearest leading vehicle.

First, at S51, as mentioned above, the trailing is started based on the received prediction information, and the flow proceeds to S52. At S52, the effective range determination is made and the flow proceeds to S53. In the effective range determination, it is determined whether a distance needing to go beyond the effective range is a predetermined value or below. For example, in the example of this embodiment, it is determined whether a distance between a coordinate of a deviation point shown by the effective range and a coordinate of a current position of the host vehicle is a predetermined value or below. The predetermined value herein is about a value to predict that the host vehicle has approach the deviation point sufficiently and can be set arbitrarily.

At S53, when it is determined that a distance needing to go beyond the effective range is the predetermined value or below, the host vehicle is predicted to have approached the deviation point sufficiently (YES at S53), and the flow proceeds to S54. When it is determined that the distance needing to go beyond the effective range is not the predetermined value or below, the host vehicle is predicted not to have approached the deviation point sufficiently (NO at S53), and the flow is ended. At S54, an inter-vehicle distance is set longer than the inter-vehicle distance (that is, a normal inter-vehicle distance) previously set in the trailing, and the flow is ended.

The effective range is used when prediction information received from a leading vehicle is used to acquire a predicted via-point of the leading vehicle. When the distance is beyond the effective range, an accuracy of the predicted via-point of the leading vehicle is likely to decrease. On the other hand, in the above structure, when the distance to beyond the effective range is the predetermined value or below, the inter-vehicle distance to the leading vehicle is set longer in the trailing. Therefore, the inter-vehicle distance between the host vehicle and the leading vehicle is set longer before an accuracy of the predicted via-point of the leading vehicle decreases, so that the inter-vehicle distance can be afforded.

In Modification 1, after transmission of the prediction information having the effective range, the effective range determination of the prediction information is successively made, and when an effective range determined in the effective range determination changes to or over the predetermined value relative to the already transmitted effective range, newly acquired prediction information may be transmitted. The predetermined value herein is settable arbitrarily. In this structure, when the effective range of the already transmitted predicted information changes to or over the predetermined value, new prediction information is transmitted together with a new effective range. Accordingly, the more accurate action in consideration of the effective range can be made in the trailing vehicles.

The following embodiment (hereinafter, Modification 2) also is contained in the technical scope of the present disclosure. Hereinafter, Modification 2 is explained in reference to the drawings. The components having the same functions as ones shown in the drawings used in the explanation of the above embodiment are indicated by the same reference numerals, and their explanation is not made.

In Modification 2, a predicted via-point of the host vehicle is acquired based on not only the prediction information acquired by the host apparatus but also a current position of a leading vehicle contained in the prediction information received from the drive assist apparatus 1 of the leading (different) vehicle.

Figure 7:
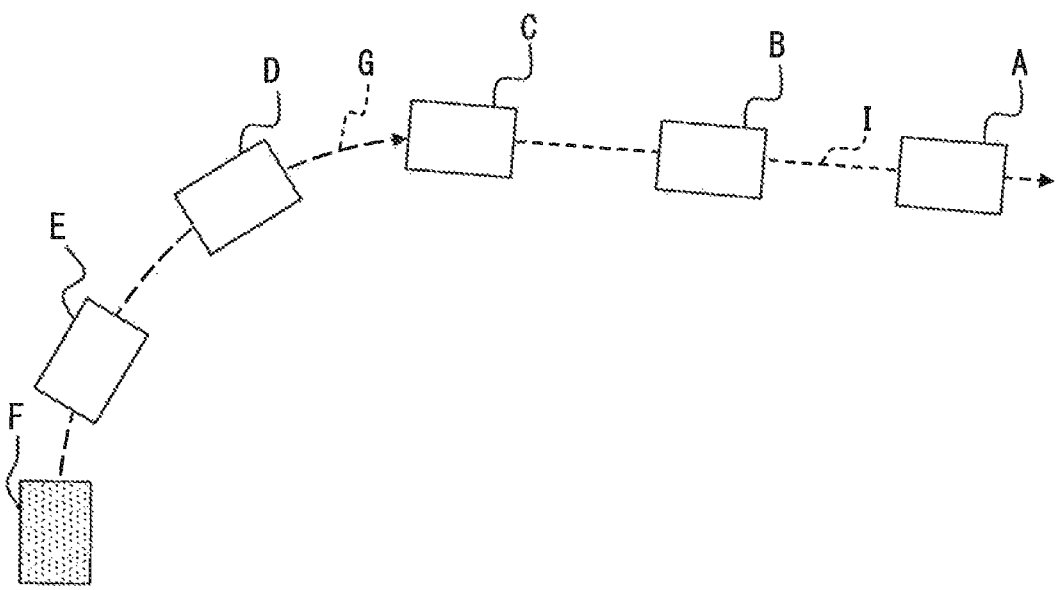
FIG. 7 is a view to explain an example in which a predicted via-point of a host vehicle is acquired based on a current position of a leading vehicle in Modification 2.

In Modification 2, the control circuit 12 of the host vehicle receives prediction information transmitted from the drive assist apparatuses 1 of multiple leading (different) vehicles, and stores current positions contained in the prediction information so as to be associated with respective vehicles identified as described above (in detail, the respective drive assist apparatuses 1). In this embodiment, as one example, as shown in FIG. 7, explanation is made below by dealing with a case where a vehicle A, a vehicle B, a vehicle C, a vehicle D, a vehicle E, and a vehicle F that mount the drive assist apparatuses 1 are arranged in this order, in which each vehicle other than the vehicle A trails a vehicle in front thereof to form a vehicle group or convoy. In Modification 2, the vehicle F is used as the host vehicle.

For example, in the control circuit 12, a prediction track of the host vehicle is determined on the basis of acquired prediction information of the host vehicle. A predicted path of the host vehicle may be determined in the same procedure as the process of S31. The control circuit 12 executes the above deviation point search, and compares the predicted path of the host vehicle with a current position of a leading vehicle contained in the prediction information received from the leading vehicle, to search for a deviation point.

When the deviation point has been retrieved, a predicted via-point of the host vehicle is acquired on the basis of the prediction information acquired by the host apparatus in a range nearer to the host vehicle than to the deviation point. On the other hand, the current position of the leading vehicle contained in the prediction information received from the drive assist apparatus 1 of the leading vehicle is used as a predicted via-point of the host vehicle in a range at the deviation point or further.

As shown in FIG. 7, when the current position of the leading vehicle is along the predicted path (G in FIG. 7) of the host vehicle, a predicted via-point of the host vehicle can be determined accurately even when a predicted via-point of the host vehicle is determined on the basis of the prediction information acquired by the host vehicle. On the other hand, when the current position of the leading vehicle does not follow the predicted path of the host vehicle, the host vehicle is likely to be located on a path (I in FIG. 7) of connected current positions of the leading vehicles. This is because, when the host vehicle trails the leading vehicle, the current position of the leading vehicle is likely to be a point where the host vehicle reaches in the future. On the other hand, in Modification 2, the current position of the leading vehicle is used as the predicted via-point of the host vehicle in the range beyond a point (that is, a deviation point) where the leading vehicle initially deviates from the predicted path of the host vehicle. Accordingly, the predicted via-point of the host vehicle can be acquired more accurately.

A current position of a leading vehicle contained in prediction information received from the drive assist apparatus 1 of the leading vehicle may be used as a predicted via-point of the host vehicle beyond a point where the current position of the leading vehicle contained in the prediction information received from the drive assist apparatus 1 of the leading vehicle is present.

In the above embodiment, the drive assist apparatus 1 operates, but does not necessarily operate, both of the inter-vehicle communications and the trailing. For example, an apparatus other than the drive assist apparatus 1 may execute trailing.

The above embodiment shows but is not limited to the structure in which the control circuit 12 identifies the drive assist apparatus 1 of a different vehicle that can communicate with the host apparatus and stores the communication target list of the identified drive assist apparatuses 1 in the memory. For example, the control circuit 12 may identify not only the drive assist apparatus 1 of a different vehicle that can communicate with the host apparatus but also a communications portion of the different vehicle that can communicate with the host apparatus to store the communication target list in the memory.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A drive assist apparatus in a vehicle, the driving assist apparatus having a prediction information acquisition section that successively acquires prediction information at a time point from an in-vehicle information detection portion, the prediction information being enabled to be transmitted via inter-vehicle communications using radio communication,
    the drive assist apparatus in the vehicle being configured to communicate via the inter-vehicle communications with any one of a plurality of different drive assist apparatuses that are individually in a plurality of different vehicles, each different drive assist apparatus having a same function as a function of the drive assist apparatus in the vehicle, wherein when the different vehicle mounting the different drive assist apparatus is a leading vehicle ahead of the vehicle, the vehicle is caused to trail the leading vehicle on a basis of prediction information that is received from the different drive assist apparatus in the leading vehicle,
    the drive assist apparatus comprising:
        a via-point prediction section to obtain a predicted via-point of the vehicle where the vehicle exists from a time point to a future time point on a basis of prediction information at the time point acquired by the prediction information acquisition section, the prediction information at the time point containing at least a position at which the vehicle exists at the time point;
        a difference determination section that,
            when the prediction information acquisition section newly acquires second prediction information at a second time point that is later than a first time point,
            obtains a difference between
                (i) a predicted via-point of the vehicle predicted at the second time point between the first time point and the future time point on a basis of first prediction information at the first time point, the first prediction information at the first time point being acquired at the first time point by the prediction information acquisition section and being already transmitted via the inter-vehicle communications and
                (ii) a position, at which the vehicle exists at the second time point, obtained on a basis of the second prediction information at the second time point,
            the difference determination section further determining whether the obtained difference is a predetermined value or more;
        a transmission determination section that
            determines that the second prediction information newly acquired is transmitted when the difference determination section determines that the difference is the predetermined value or more, and
            determines that the second prediction information newly acquired is not transmitted when the difference determination section determines that the difference is not the predetermined value or more;
        a path prediction section that predicts a future vehicle-traveling path of the vehicle from predicted via-points of the vehicle successively obtained by the via-point prediction section;
        a deviation point search section that performs a search for a deviation point based on (i) a position of each of the leading vehicles contained in the prediction information of the each of the leading vehicles and (ii) the predicted future vehicle-traveling path of the vehicle predicted by the path prediction section,
            the deviation point being a point at which the leading vehicle starts to deviate from the predicted future vehicle-traveling path of the vehicle; and
        an effective range determination section that determines, when the deviation point is obtained by the search of the deviation point search section, an effective range of the prediction information on a basis of the deviation point that is obtained by the search of the deviation point search section,
            the effective range of the prediction information being a range where the prediction information transmitted from the vehicle is effective in obtaining a predicted via-point of the vehicle,
        wherein
        the effective range of the prediction information determined by the effective range determination section is also transmitted when the prediction information is transmitted from the vehicle via the inter-vehicle communications.

2. The drive assist apparatus according to claim 1, further comprising:

a communication target identification section to identify a subject different drive assist apparatus being any one of the plurality of different drive assist apparatuses in the different vehicles with which the inter-vehicle communications are enabled, on a basis of reception of information from the subject different drive assist apparatus, wherein:

in cases that the subject different drive assist apparatus is identified by the communication target identification section newly after the first prediction information at the first time point is transmitted via the inter-vehicle communications, the second prediction information at the second information newly acquired by the prediction information acquisition section is transmitted even when the transmission determination section determines that the second prediction information is not transmitted.

3. The drive assist apparatus according to claim 1, wherein:

in cases where the effective range of the prediction information determined by the effective range determination section changes by a predetermined value or more after the first prediction information is transmitted via the inter-vehicle communications, even when the transmission determination section determines that the second prediction information is not transmitted, the second prediction information newly acquired by the prediction information acquisition section is transmitted.

4. The drive assist apparatus according to claim 1, wherein:

when the prediction information and the effective range of the prediction information are received from the different drive assist apparatus mounted to the leading vehicle nearest to the vehicle, the vehicle is caused to trail the leading vehicle with a first inter-vehicle distance to the leading vehicle on a basis of the prediction information received from the different drive assist apparatus, whereas the vehicle is caused to trail the leading vehicle with a second inter-vehicle distance to the leading vehicle longer than the first inter-vehicle distance when a distance needing to go beyond the effective range becomes a predetermined value or below.

5. The drive assist apparatus according to claim 1, wherein:

when the deviation point search section performs the search for the deviation point where the leading vehicle starts to deviate from the future vehicle-traveling path of the vehicle, the effective range determination section predicts a time point for the vehicle to reach the deviation point, and determines the predicted time point as the effective range.

6. The drive assist apparatus according to claim 1, wherein:

when the deviation point search section performs the search for the deviation point where the leading vehicle starts to deviate from the future vehicle-traveling path of the vehicle, the effective range determination section determines, as the effective range, positional information indicating the deviation point obtained by the search performed by the deviation point search section.

7. A drive assist system comprising:

the drive assist apparatus according to claim 1 mounted to each of a plurality of vehicles.

8. A drive assist apparatus in a vehicle, the drive assist apparatus having a prediction information acquisition section that successively acquires prediction information at a time point from an in-vehicle information detection portion, the prediction information being enabled to be transmitted via inter-vehicle communications using radio communications, the drive assist apparatus in the vehicle being configured to communicate via the inter-vehicle communications with any one of a plurality of different drive assist apparatuses that are in a plurality of different vehicles, each different drive assist apparatus having a same function as a function of the drive assist apparatus in the vehicle, wherein when the different vehicle mounting the different drive assist apparatus is a leading vehicle ahead of the vehicle, the vehicle is caused to trail the leading vehicle on a basis of prediction information that is received from the different drive assist apparatus in the leading vehicle, the drive assist apparatus comprising:

a via-point prediction section to obtain a predicted via-point of the vehicle where the vehicle exists from a time point to a future time point on a basis of prediction information at the time point acquired by the prediction information acquisition section, the prediction information at the time point containing at least a position at which the vehicle exists at the time point;

a path prediction section that predicts a future vehicle-traveling path of the vehicle from predicted via-points of the vehicle successively obtained by the via-point prediction section;

a deviation point search section that performs a search for a deviation point based on (i) a position of each of the leading vehicles contained in the prediction information of the each of the leading vehicles and (ii) the predicted future vehicle-traveling path of the vehicle predicted by the path prediction section, the deviation point being a point at which the leading vehicle starts to deviate from the predicted future vehicle-traveling path of the vehicle; and an effective range determination section that determines, when the deviation point is obtained by the search of the deviation point search section, an effective range of the prediction information on a basis of the deviation point that is obtained by the search of the deviation point search section, the effective range of the prediction information being a range where the prediction information transmitted from the vehicle is effective in obtaining a predicted via-point of the vehicle, wherein the effective range of the prediction information determined by the effective range determination section is also transmitted when the prediction information is transmitted from the vehicle via the inter-vehicle communications.

9. The drive assist apparatus according to claim 8, wherein:

when the prediction information and the effective range of the prediction information are received from the different drive assist apparatus mounted to the leading vehicle nearest to the vehicle, the vehicle is caused to trail the leading vehicle with a first inter-vehicle distance to the leading vehicle on a basis of the prediction information received from the different drive assist apparatus, whereas the vehicle is caused to trail the leading vehicle with a second inter-vehicle distance to the leading vehicle longer than the first inter-vehicle distance when a distance needing to go beyond the effective range becomes a predetermined value or below.

10. The drive assist apparatus according to claim 9, wherein:

when the deviation point search section performs the search for the deviation point where the leading vehicle starts to deviate from the future vehicle-traveling path of the vehicle, the effective range determination section predicts a time point for the vehicle to reach the deviation point, and determines the predicted time point as the effective range.

11. The drive assist apparatus according to claim 9, wherein:

when the deviation point search section performs the search for the deviation point where the leading vehicle starts to deviate from the future vehicle-traveling path of the vehicle, the effective range determination section determines, as the effective range, positional information indicating the deviation point obtained by the search performed by the deviation point search section.

* * * * *